May 11, 1965  R. HUG  3,182,842
CONTAINER
Filed Feb. 11, 1963  4 Sheets-Sheet 1

INVENTOR
Rudolf Hug

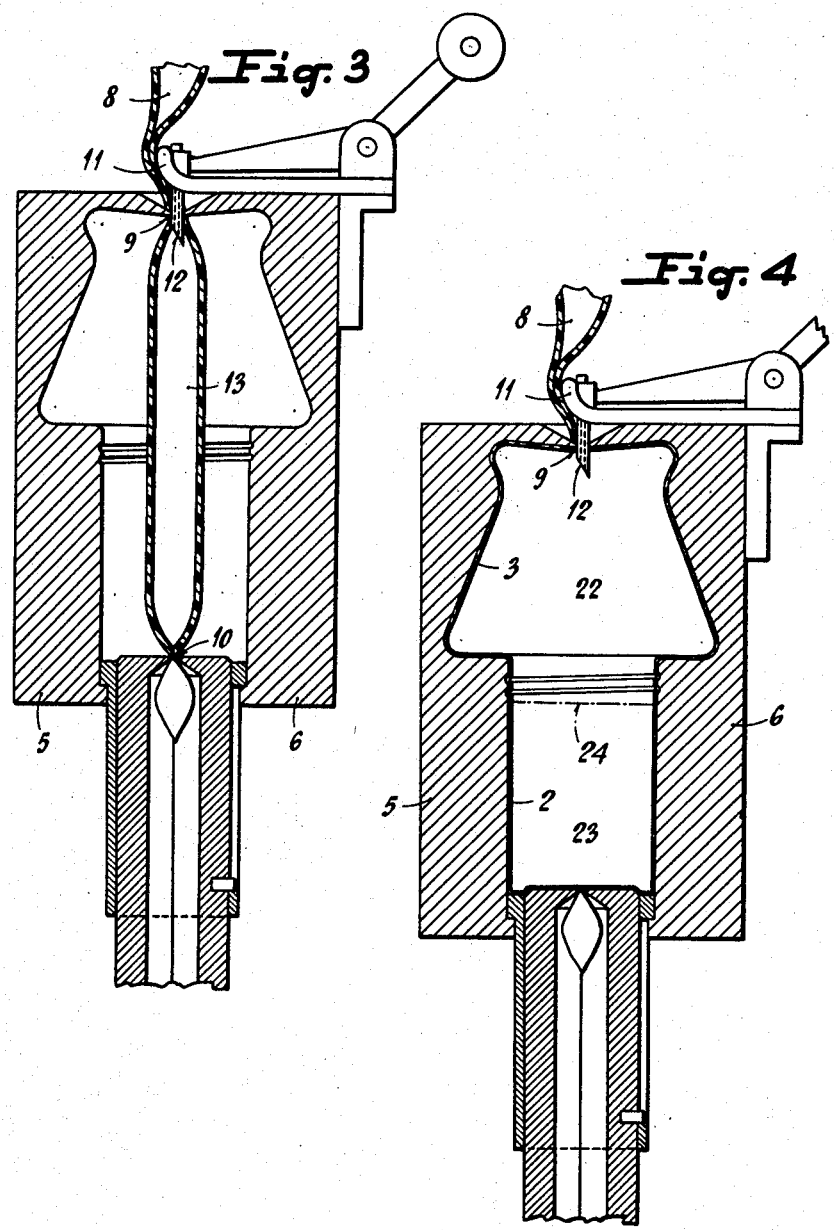

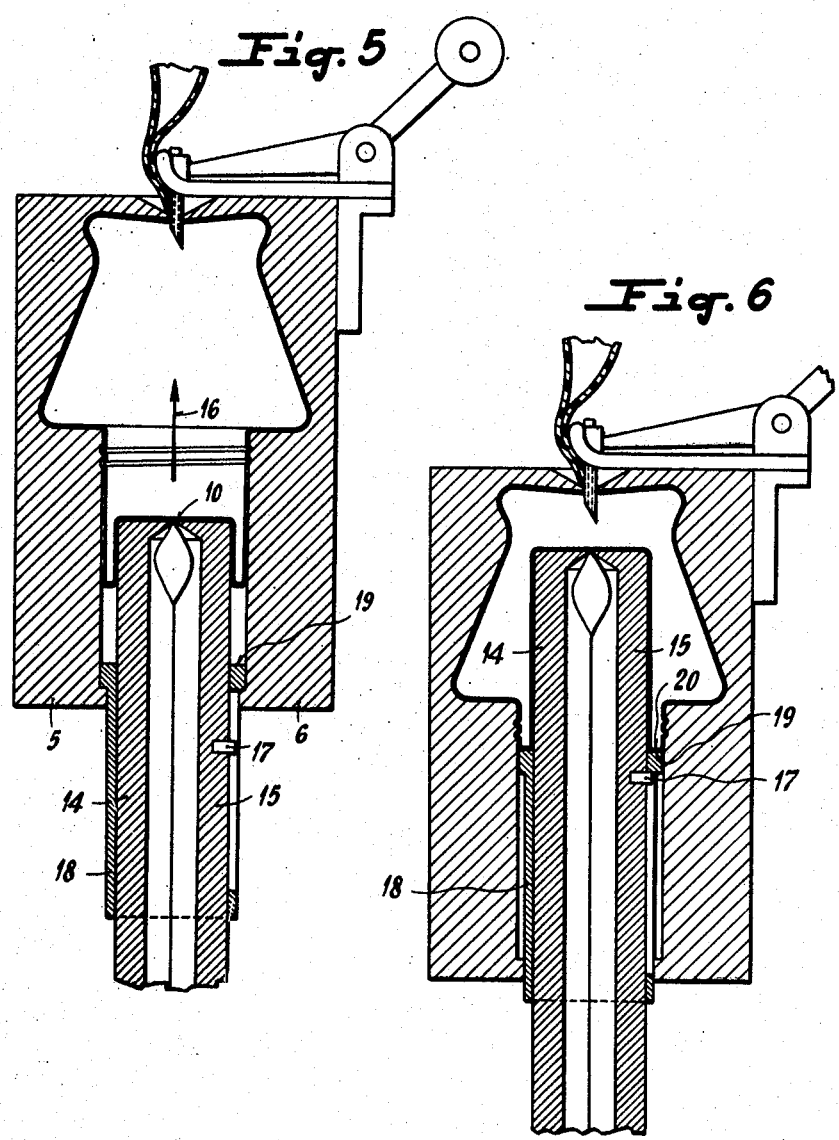

May 11, 1965  R. HUG  3,182,842
CONTAINER
Filed Feb. 11, 1963  4 Sheets-Sheet 4

United States Patent Office 3,182,842
Patented May 11, 1965

3,182,842
CONTAINER
Rudolf Hug, Liestal, Switzerland, assignor to Proplasto A.G., Liestal, Switzerland, a corporation of Switzerland
Filed Feb. 11, 1963, Ser. No. 257,598
Claims priority, application Switzerland, Feb. 9, 1962, 1,640/62
8 Claims. (Cl. 215—13)

This invention is concerned with an improved container made from thermoplastic synthetic resin, a process for its production and an apparatus suitable for use in the production of the container.

Double-walled containers made from synthetic resin, which comprise an interior portion adapted to receive the contents and an exterior portion, different in shape from the interior portion, are known. Such containers are used especially for packing cosmetics, such as ointments, creams and the like.

Containers of this type are generally produced in two parts, the two parts being joined together, for example, by glueing, fusion, or even only by a tight fit.

It is an object of the present invention to provide a double-walled container which is of integral construction, that is, the inner and outer portions are formed from a single blank.

Accordingly, the present invention provides a double-walled container made from thermoplastic synthetic resin comprising an interior portion adapted to receive the contents and an exterior portion shaped differently from the interior portion, in which the interior and exterior portions are formed from a single thin-walled, self-closed hollow body.

The container according to the invention may be formed from any suitable thermoplastic synthetic resin, for example polystyrene or polyethylene, or a polyacrylate or poly-methacrylate; polyvinyl chloride is particularly preferred.

If desired, the outside of the mouth of the container may be provided with means for attaching a closure, for example, a flange, one or more grooves or a thread, so that the container may be closed, for example with a snap-closure or screw-on lid.

The container according to the invention may be produced in any convenient manner, for example by moulding. Preferably, the container is produced by a process which constitutes a feature of the invention, in which a hollow blank of thermoplastic synthetic resin in plastic condition is formed in the interior of the mould and a cavity is formed in said blank by displacing a part of the mould towards and into the interior of the hollow blank.

The hollow blank may be formed inside the mould, for example, by applying a fluid under pressure onto one side of the blank.

Preferably, the hollow blank is substantially prevented from detaching itself from the sides of the mould during the cavity-forming step by means of one or more grooves formed in the side(s) of the mould near that part of the mould at which the cavity is formed.

During the formation of the cavity, it is preferred to maintain an excess pressure in the interior of the hollow blank.

When the cavity has been formed, it is preferred to press substantially flat the curved portion of the container joining the interior and exterior portions, by means of a movable part of the mould which is preferably annular in shape.

The invention also provides an apparatus suitable for use in the production of containers according to the invention. Said apparatus comprises a first section generally corresponding in shape to the exterior portion of the container and an adjacent second tube-like section bounded by a movable mould portion capable of being displaced towards and into the interior of said first section, said movable portion comprising a plunger and sleeve surrounding said plunger.

Preferably, the plunger comprises two members which are capable of being moved independently of each other.

The first mould section is preferably provided with a least one groove near the joint between the first section and the second section, so that, in operation, the hollow body formed within the mould may be substantially prevented from separating from the side of the mould.

For a better understanding of the invention, a preferred embodiment of the container, as well as a preferred method of carrying out the process for the production thereof, and a preferred embodiment of an apparatus suitable for carrying out the process, will now be described for the purposes of illustration only, with reference to the accompanying drawings, in which like numerals are used to refer to like parts throughout.

In the drawings:

FIGURES 2 to 7 show consecutive steps in the production of the container shown in FIGURE 1, the apparatus being shown in sectional elevation.

Figure 1:
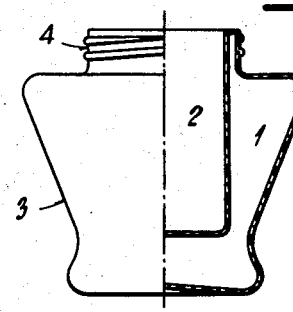
FIGURE 1 is an elevation, partly in section, of a preferred form of the container according to the invention.

It will be noted that, as shown in the drawings, the assembly of the mould takes place simultaneously with the production of the container.

The container shown in FIGURE 1 consists of a single self-closed, thin walled hollow body 1 of thermoplastic synthetic resin. As indicated above, any desired thermoplastic synthetic resin may be used for the formation of the container, polyvinyl chloride being particularly preferred.

The interior portion of the container, which is adapted to receive the contents, encloses a space 2. The exterior portion 3 of the container is shaped differently from the interior portion 2. The outside of the mouth of the container is provided with a thread 4 so that the container may, if desired, be closed with a screw-on lid. However, depending on the type of closure it is desired to use the thread may be replaced by other suitable means for retaining the closure in position, such as, for example a flange or groove for retaining a snap-on cap.

Figure 2:
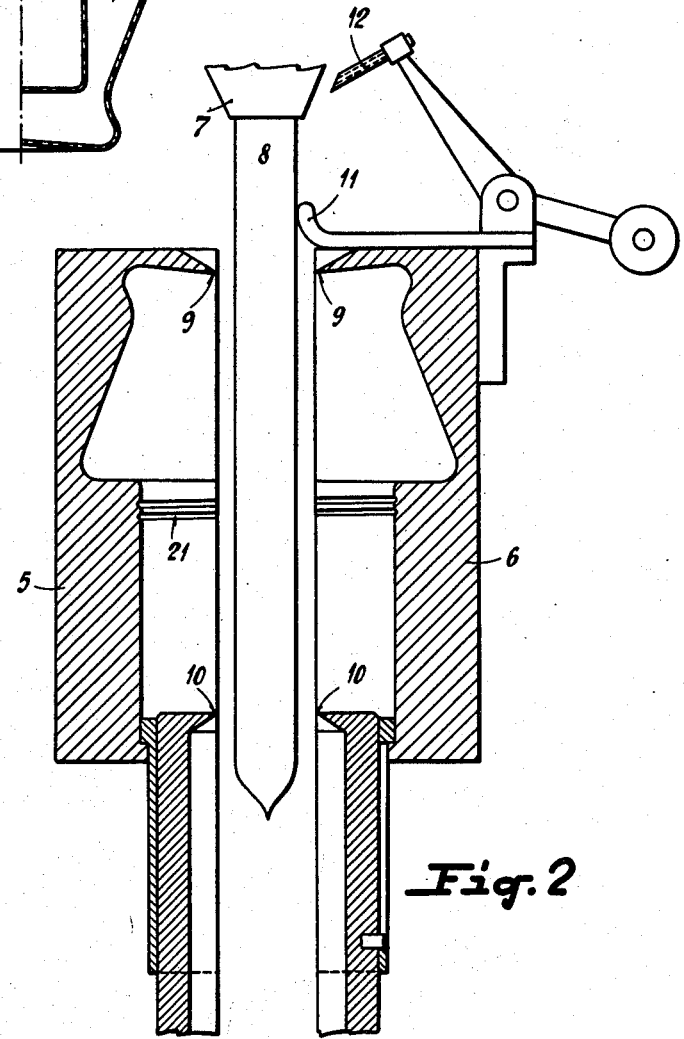

Particularly suitable for the production of the container according to the invention is a mould comprising a plurality of parts, which may be opened and closed a conventional manner. Such a mould is shown, open, FIGURE 2. The mould shown in FIGURE 2 comprises two halves, 5 and 6. In the first stage of the process the mould is placed open beneath an extrusion head 7, from which is extruded a hollow strand 8 of thermoplastic synthetic resin in plastic condition.

FIGURE 3 shows the next stage in the process, the mould having been closed. A part of the hollow strand 8 is cut off within the mould by the pairs of jaws 9 and 10. A bar 11 affixed to the half-mould 6 pushes the strand 8 aside, so that an injection needle 12 may be inserted through an opening in the jaws 9 into the interior of the portion 13 of the strand 8.

In the next step, compressed air is introduced through the needle 12 into the interior of the portion 1 thereby expanding the resin and forming a single hollow body which conforms in shape to the mould. The air which is trapped between the sides of the mould and the strand portion 13 escapes at the joint between the half moulds. This stage of the process is shown in FIGURE 4.

The interior of the mould may be divided, for convenience, into two sections, that is, a first section 2 rally corresponding in shape to the exterior portion the container, and a second section 23, from which interior portion 2 of the container is formed. The ion between the two sections 22 and 23 is indicated the broken line 24. It will be appreciated that ughout these stages the resin remains in plastic state.

the next stage of the process as shown in FIGURE he interior portion of the container is formed by incing the lower part of the mould towards and into interior of the hollow body. As shown in FIGURE ne piston, which consists of two movable members nd 15 is advanced, in the direction of the arrow 16. he movable members 14 and 15 are provided with 10 and are adapted to be separated simultaneously the opening of the mould by separating the half- lds 5 and 6. Excess pressure is maintained in the ior of the hollow body during the advance of the ibers 14 and 15.

he members 14 and 15 are surrounded by a movable ve 18 which is in two sections. The member 15 is ided with a pin 17 which is adapted to engage with sleeve 18. The upper end of the sleeve forms a flat ace 19.

FIGURE 6 the members 14 and 15 have reached terminal position. Simultaneously the surface 19 ses against the resin, thus forming a flat surface 20 id the rim of the container. Preferably, the depth ne mould section 23 is slightly smaller than the depth he interior portion 2 of the container, so that the t is subjected to a slight tension during this step of process to produce a smooth surface inside the portion id on the upper surface 20 of the rim.

ne groove 21 (FIGURE 2) from which the thread moulded, formed in the sides of the mould, serves to ce the risk of the hollow body separating from the s of the mould. If desired, the groove 21 may take other suitable non-threadlike shape. Alternatively, gh excess pressure may be maintained within the hol- body.

Figure 7:
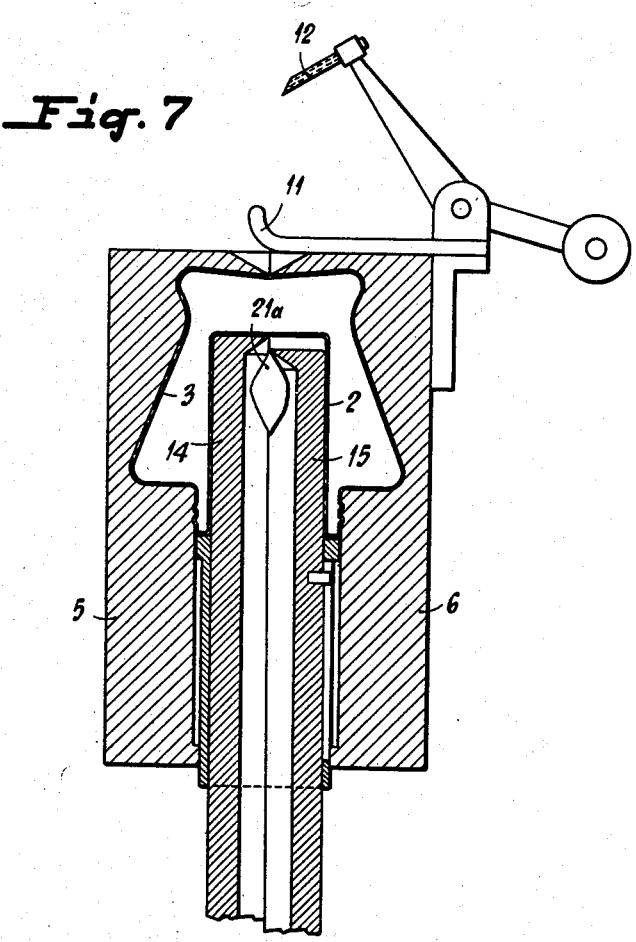

'hen the members 14 and 15 have reached the termi- position, the resin is allowed to solidify and excess sure inside the hollow body is released.

o open the mould, the members 14 and 15 should be withdrawn. Preferably, one of the members 14 15 is first withdrawn through a short distance. This e is shown in FIGURE 7, where the member 15 is itly displaced and member 14 remains in the terminal tion, so that the piece of resin 21a remaining between jaws may be loosened. Both members 14 and 15 are removed and the mould opened by separating half- lds 5 and 6. The mould may then be used for a her cycle of operations.

claim:

A double-walled container made from thermoplastic hetic resin, comprising an interior portion adapted eceive the contents and an exterior portion shaped rently from the interior portion, in which the interior exterior portions are formed from a single, thin- ed, self-closed hollow body, said exterior portion hav- a peripheral wall which has an axis, a bottom wall an upper neck of diameter no greater than the diam- of said peripheral wall, said inner portion compris- a peripheral wall and a bottom wall respectively edly and unsupportedly opposing the outer portion pheral wall and bottom wall, said inner portion peripheral wall extending into said neck and spaced therefrom, said container also comprising a flat annular top rim transverse to said axis, the outer edge of said rim connected to the upper edge of said neck, the inner edge of said rim connected to the top edge of said inner portion peripheral wall.

2. A process for the production of the container as claimed in claim 1, comprising blow molding a single body blank of said thermoplastic synthetic resin in a mold, said body blank having an upper portion corresponding to the finished exterior portion in inverted condition and a lower portion having a blank peripheral wall of diameter equal to the diameter of said neck, and a bottom blank wall, moving a plunger of diameter equal to finished interior portion diameter upwardly into the mold against the bottom blank wall a distance sufficient to form the material of the blank lower portion into the finished interior portion in inverted condition with the interior portion top wall against the top of the plunger and the interior portion peripheral wall around the periphery of the plunger, then moving a sleeve over said plunger and upwardly into said mold to flatten the connection between the inner and outer portion peripheral walls into the finished rim, and withdrawing the sleeve and plunger.

3. A container according to claim 1 wherein the exterior of the neck of the container is provided with means for attaching a closure.

4. A container according to claim 3 wherein said thermoplastic synthetic resin is polyvinyl chloride.

5. A process for the production of a container as claimed in claim 1 in which a hollow blank of thermoplastic synthetic resin in plastic condition is blow-moulded in the interior of a mould and a cavity is formed in said blank by displacing a part of the mould towards and into the interior of the hollow blank.

6. A process according to claim 5 wherein the hollow blank is substantially prevented from detaching itself from the sides of the mould during the cavity-forming step by means of one or more grooves formed in the side of the mould near that part of the mould at which the cavity is formed.

7. A process according to claim 5 in which an excess pressure is maintained in the interior of the hollow blank during the cavity-forming step.

8. A process according to claim 7 in which, after the formation of the cavity, a curved portion of the container joining the interior and exterior portions is pressed to a substantially flat surface by means of a movable part of the mould.

References Cited by the Examiner
UNITED STATES PATENTS

| 1,627,649 | 5/27 | Karabin et al. | 215—13 |
| 2,051,446 | 8/36 | Ice | 215—132 |
| 2,725,733 | 12/55 | Davis | 215—13 |
| 2,776,069 | 1/57 | Zimmerman | 220—9 |
| 3,016,159 | 1/62 | Bramming | 215—13 |
| 3,025,562 | 3/62 | Nelson | 18—5 |
| 3,028,624 | 4/62 | Parfrey et al. | 18—5 |

THERON E. CONDON, *Primary Examiner.*

EARLE J. DRUMMOND, *Examiner.*